United States Patent Office 3,005,530
Patented Oct. 24, 1961

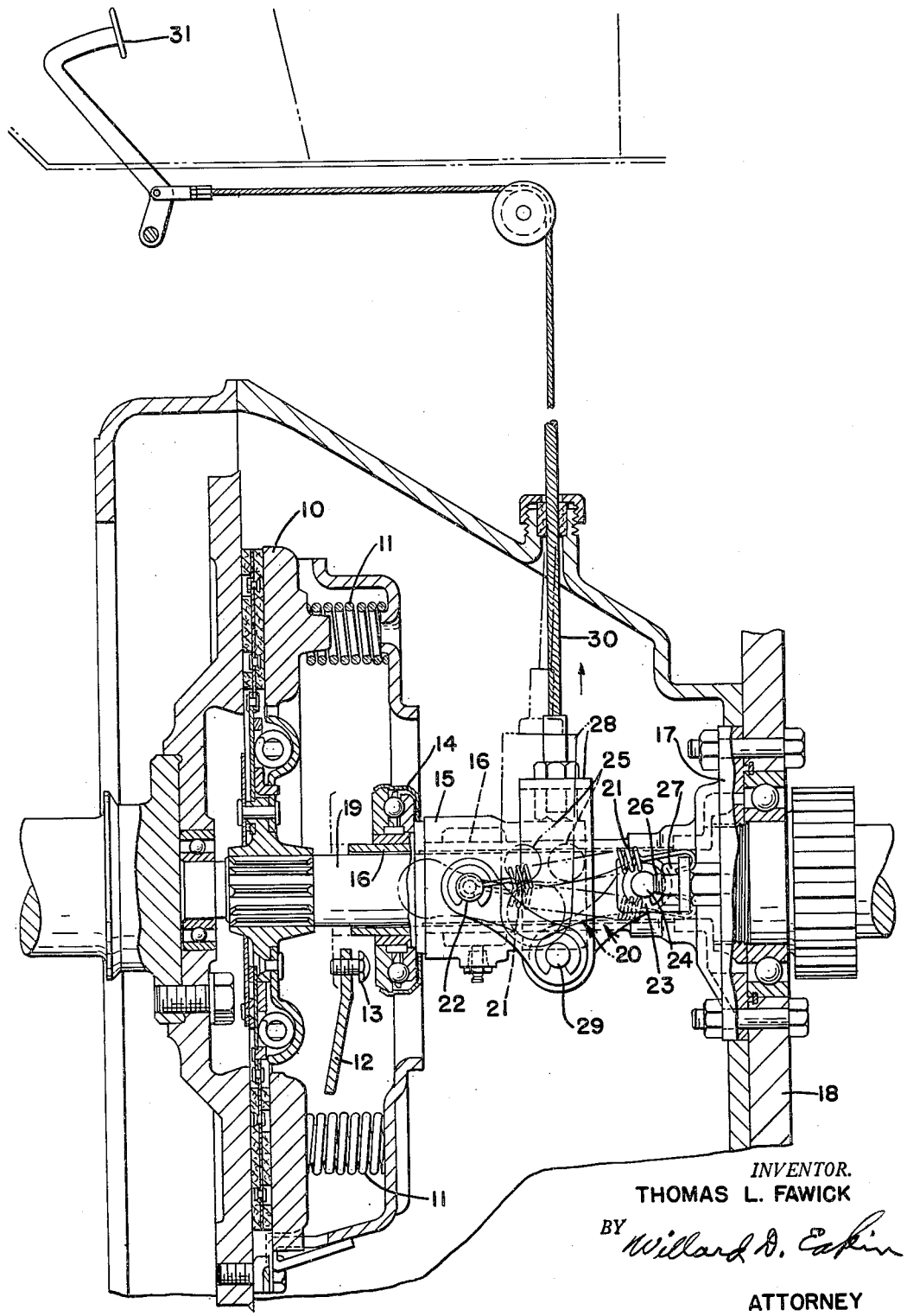

3,005,530
ACTUATING ASSEMBLY FOR CLUTCHES AND BRAKES
Thomas L. Fawick, Cleveland, Ohio, assignor to Fawick Corporation, a corporation of Michigan
Filed July 14, 1958, Ser. No. 748,244
1 Claim. (Cl. 192—99)

This invention relates to mechanism for actuating a vehicle clutch or brake and is of especial advantage for remote-control disengagement of a clutch, as in the case of a truck or the like in which the clutch pedal is a long way from the clutch, with various obstructing structural elements between them.

Its chief objects are to provide a mechanism adapted to be easily mounted and to function dependably in spite of those circumstances; to provide a mechanism having a diminishing requirement of pedal pressure from the beginning toward the end of the pedal movement, so that the pedal can be held in its advanced position for such time as may be required without tiring of the operator; and to provide more detailed advantages that will be manifest.

The single figure of the drawing is a vertical, longitudinal section, with some parts shown somewhat diagrammatically, of parts of an assembly embodying my invention in its preferred form as applied to a spring-engaged clutch.

The clutch here shown is of a well known standard type, comprising a rotary clutch element 10 constantly urged toward engaged position by a circumferentially spaced set of compression springs such as the spring 11, and comprising mechanism of a standard type through which disengagement of the clutch, against the force of the springs 11, is effected by movement to the left of the inwardly projecting end portions of a circumferentially spaced set of arms such as the arm 12, which rotate with the clutch element 10 and the springs 11.

For so moving the arms 12 each of them has mounted in its end portion a tight-thread adjusting stud 13, each stud being formed with a domed head for permissibly sliding engagement by the adjacent race of a thrust-bearing 14.

The other race of the said thrust bearing is mounted upon a non-rotatable slide sleeve 15 which is mounted upon a guideway sleeve extension 16 of a bracket 17 which is secured to the vehicle's transmission gear case 18 and surrounds the clutch shaft, 19.

The bracket 17 and the sleeve 15 slidably mounted upon it are connected by two toggles, such as the toggle 20, at the respective sides of the assembly, the toggles being adapted to force the sleeve 15 and bearing 14 to the left in the straightening of the toggles, and to permit their reverse movement in the return of the toggles to their less straightened condition.

For constantly urging the toggles toward their less straightened condition each toggle has a pull spring 21 connecting the toggle stud 22, preferably press-fitted into the sleeve 15, with a stamped-metal bracket 23 to which the adjacent toggle arm is hinged at 24.

To limit the straightening movement of the toggles, so that the springs 21 will return them to their less straightened condition, respective stop studs, such as the stud 25, are cast upon the sleeve 15 and are adapted to be abutted by arms of the respective toggles, as represented in dotted lines.

For mounting each of the brackets 23 upon the slide-bearing bracket 17 the adjacent one of the bolts that secure the bracket 17 to the transmission gear case is formed with a threaded extension from its head, such as the extension 26, for reception of the apertured base of the bracket 23 and a clamping nut 27.

Each bracket 23 is formed with a hole for engagement therein of the end hook of the spring 21 and use of identical brackets 23 at the two sides of the assembly results in one of the springs being anchored at the top of its bracket 23 and the other being anchored at the bottom of its bracket, but without substantial difference in their functioning.

For effecting the straightening movement of the toggles a yoke or clevis 28 has its arms hinged as at 29 to the respective elbow joints of the toggles and has its arch portion connected by a flexible cable 30 which runs, over such guide pulleys as may be required, to the remotely positioned clutch pedal 31.

The appended claim is inclusive of possible modifications.

I claim:

In combination with two relatively rotatable structures having confronting faces for torque sustaining engagement with one another, one of said structures being movable in opposite directions to either establish or dis-establish the torque sustaining engagement between said faces, the improvement which comprises an axially extending sleeve which is movable axially in one direction to effect movement of said one structure in one direction, a toggle for moving said sleeve axially, said toggle comprising a pair of rigid arms having a pivotal connection to one another and respectively extending in opposite directions away from said pivotal connection, one of said toggle arms away from said pivotal connection to the other toggle arms being pivotally connected to said sleeve in force-transmitting relationship therewith, the other toggle arm away from said first-mentioned pivotal connection having a fixed pivotal support, said pivotal connection between the toggle arms being disposed at one side of the axis of movement of the sleeve, a flexible pull cable connected to said pivotal connection between the toggle arms and extending therefrom to the opposite side of said axis, and a stop stud fixed to said sleeve and interposed in the path of movement of said toggle to prevent the respective toggle arms from reaching a position in direct axial alignment with one another.

References Cited in the file of this patent
UNITED STATES PATENTS

| | | |
|---|---|---|
| 627,084 | Wyman | June 13, 1899 |
| 696,973 | Holmes | Apr. 8, 1902 |
| 1,371,542 | Bailey | Mar. 15, 1921 |
| 1,880,721 | Blanchard | Oct. 4, 1932 |
| 1,927,643 | Hughes | Sept. 19, 1933 |
| 1,954,234 | Zimmermann | Apr. 10, 1934 |
| 1,981,807 | Lyman | Nov. 20, 1934 |
| 2,494,410 | Scheidt | Jan. 10, 1950 |

FOREIGN PATENTS

| | | |
|---|---|---|
| 28,879 | Great Britain | of 1910 |